US010104665B2

(12) United States Patent
Ngo et al.

(10) Patent No.: US 10,104,665 B2
(45) Date of Patent: *Oct. 16, 2018

(54) METHOD AND APPARATUS FOR PROVIDING DYNAMIC FREQUENCY SELECTION SPECTRUM ACCESS IN PEER-TO-PEER WIRELESS NETWORKS

(71) Applicant: NETWORK PERFORMANCE RESEARCH GROUP LLC, San Jose, CA (US)

(72) Inventors: Terry F K Ngo, Bellevue, WA (US); Seung Baek Yi, Norwich, VT (US); Erick Kurniawan, San Francisco, CA (US); Kun Ting Tsai, Freemont, CA (US)

(73) Assignee: NETWORK PERFORMANCE RESEARCH GROUP LLC, San Jose, CA (US)

( * ) Notice: Subject to any disclaimer, the term of this patent is extended or adjusted under 35 U.S.C. 154(b) by 137 days.

This patent is subject to a terminal disclaimer.

(21) Appl. No.: 15/259,359

(22) Filed: Sep. 8, 2016

(65) Prior Publication Data
US 2017/0048864 A1    Feb. 16, 2017

Related U.S. Application Data

(63) Continuation-in-part of application No. 15/225,966, filed on Aug. 2, 2016, which is a continuation of
(Continued)

(51) Int. Cl.
*H04L 12/28*    (2006.01)
*H04W 72/04*    (2009.01)
(Continued)

(52) U.S. Cl.
CPC ....... *H04W 72/0453* (2013.01); *H04L 67/104* (2013.01); *H04W 16/14* (2013.01)

(58) Field of Classification Search
USPC ........................................ 370/252, 329, 430
See application file for complete search history.

(56) References Cited

U.S. PATENT DOCUMENTS 5,978,669 A    11/1999  Sanmugam
6,181,952 B1    1/2001  Murata
(Continued)

FOREIGN PATENT DOCUMENTS

EP    2512169 A1    10/2012
EP    1925108 B1    3/2014
(Continued)

OTHER PUBLICATIONS

Office Action for U.S. Appl. No. 14/920,568, dated Mar. 29, 2016, 29 pages.
(Continued)

*Primary Examiner* — John Pezzlo
(74) *Attorney, Agent, or Firm* — Amin, Turocy & Watson, LLP

(57) ABSTRACT

The present invention relates to wireless networks and more specifically to a method and apparatus for providing dynamic frequency selection (DFS) spectrum access in peer-to-peer wireless networks. Embodiments of the present invention include a standalone DFS master coupled to a client device and configured to collect and/or generate spectral information associated with a plurality of 5 GHz DFS communication channels and a cloud intelligence engine that is also coupled to the client device and configured to receive the spectral information via the client device. The cloud intelligence engine is configured to determine a list of one or more communication channels for the stand-
(Continued)

alone multi-channel DFS master from the plurality of 5 GHz DFS communication channels.

15 Claims, 10 Drawing Sheets

Related U.S. Application Data application No. 15/085,573, filed on Mar. 30, 2016, now Pat. No. 9,439,197.

(60) Provisional application No. 62/314,042, filed on Mar. 28, 2016, provisional application No. 62/203,383, filed on Aug. 10, 2015.

(51) Int. Cl.
*H04W 16/14* (2009.01)
*H04L 29/08* (2006.01)
*H04J 1/16* (2006.01)

(56) References Cited

U.S. PATENT DOCUMENTS

| | | | |
|---|---|---|---|
| 6,870,815 B2 | 3/2005 | McFarland et al. | |
| 7,457,628 B2 | 11/2008 | Blumberg et al. | |
| 7,548,750 B2 | 6/2009 | Kruys et al. | |
| 7,606,193 B2 | 10/2009 | McFarland et al. | |
| 7,813,744 B2 | 10/2010 | Johnson | |
| 8,213,942 B2 | 7/2012 | Likar et al. | |
| 8,239,337 B2 | 8/2012 | Madani | |
| 8,260,357 B2 | 9/2012 | Likar et al. | |
| 8,472,334 B2 | 6/2013 | Likar et al. | |
| 8,483,059 B2 | 7/2013 | Likar et al. | |
| 8,565,106 B2 | 10/2013 | Likar et al. | |
| 8,654,782 B2 | 2/2014 | Meil et al. | |
| 8,699,341 B2 | 4/2014 | Likar et al. | |
| 8,867,490 B1 | 10/2014 | Krishna et al. | |
| 8,879,996 B2 | 11/2014 | Kenney et al. | |
| 8,885,511 B2 | 11/2014 | Likar et al. | |
| 9,060,289 B2 | 6/2015 | Chandrasekhar et al. | |
| 9,066,251 B2 | 6/2015 | Madan et al. | |
| 9,131,391 B2 | 9/2015 | Madan et al. | |
| 9,131,392 B2 | 9/2015 | Madan et al. | |
| 9,131,504 B2 | 9/2015 | Kenney et al. | |
| 9,307,413 B2 | 4/2016 | Lenzini et al. | |
| 9,363,743 B2 | 6/2016 | Xue et al. | |
| 9,439,197 B1 | 9/2016 | Ngo et al. | |
| 9,622,089 B1 | 4/2017 | Ngo et al. | |
| 2002/0116380 A1 | 8/2002 | Chen et al. | |
| 2003/0107512 A1 | 6/2003 | McFarland et al. | |
| 2003/0181213 A1 | 9/2003 | Sugar et al. | |
| 2004/0033789 A1 | 2/2004 | Tsien | |
| 2004/0146022 A1 | 7/2004 | Lewis et al. | |
| 2004/0151137 A1 | 8/2004 | McFarland et al. | |
| 2004/0156336 A1 | 8/2004 | McFarland et al. | |
| 2004/0242188 A1 | 12/2004 | Uchida et al. | |
| 2005/0059364 A1 | 3/2005 | Hansen et al. | |
| 2005/0192016 A1 | 9/2005 | Zimmermann et al. | |
| 2005/0215266 A1* | 9/2005 | Tsien | H04W 16/14 455/454 |
| 2005/0272435 A1 | 12/2005 | xTsien et al. | |
| 2006/0082489 A1 | 4/2006 | Liu et al. | |
| 2007/0060065 A1 | 3/2007 | Kruys et al. | |
| 2007/0126622 A1 | 6/2007 | Nallapureddy et al. | |
| 2008/0016556 A1 | 1/2008 | Selignan | |
| 2008/0049918 A1 | 2/2008 | Heinze et al. | |
| 2008/0089280 A1 | 4/2008 | Hu | |
| 2009/0077620 A1 | 3/2009 | Ravi et al. | |
| 2009/0116411 A1 | 5/2009 | Castagnoli et al. | |
| 2009/0146866 A1 | 6/2009 | Matsumoto et al. | |
| 2009/0160696 A1 | 6/2009 | Pare et al. | |
| 2009/0201851 A1 | 8/2009 | Kruys et al. | |
| 2010/0061289 A1 | 3/2010 | Mun et al. | |
| 2010/0216480 A1 | 8/2010 | Park et al. | |
| 2010/0271948 A1 | 10/2010 | Challapali et al. | |
| 2010/0302966 A1 | 12/2010 | Matsuura | |
| 2011/0126110 A1 | 5/2011 | Vilke et al. | |
| 2012/0039265 A1 | 2/2012 | Patel et al. | |
| 2012/0258749 A1 | 10/2012 | Lenzini et al. | |
| 2012/0300759 A1 | 11/2012 | Patanapongpibul et al. | |
| 2013/0072106 A1 | 3/2013 | Koskela et al. | |
| 2013/0171941 A1 | 7/2013 | Kenney et al. | |
| 2013/0201928 A1 | 8/2013 | Kim et al. | |
| 2013/0252640 A1 | 9/2013 | Kenney et al. | |
| 2013/0314267 A1 | 11/2013 | Kenney et al. | |
| 2014/0036691 A1 | 2/2014 | Madan et al. | |
| 2014/0171060 A1 | 6/2014 | Cook et al. | |
| 2014/0241226 A1 | 8/2014 | Jia et al. | |
| 2014/0253361 A1 | 9/2014 | Rezk et al. | |
| 2014/0301328 A1 | 10/2014 | Yacovitch | |
| 2014/0328286 A1 | 11/2014 | Crowle et al. | |
| 2014/0349669 A1 | 11/2014 | Qi et al. | |
| 2014/0362782 A1 | 12/2014 | Yuk et al. | |
| 2015/0023271 A1 | 1/2015 | Nakano | |
| 2015/0063321 A1 | 3/2015 | Sadek et al. | |
| 2015/0177720 A1 | 6/2015 | Anderson et al. | |
| 2015/0189528 A1 | 7/2015 | Carbajal | |
| 2015/0208330 A1 | 7/2015 | Park et al. | |
| 2015/0256323 A1 | 9/2015 | Gandarillas Diego et al. | |
| 2015/0263886 A1 | 9/2015 | Wang et al. | |
| 2015/0271829 A1 | 9/2015 | Amini et al. | |
| 2016/0014613 A1 | 1/2016 | Ponnampalam et al. | |
| 2016/0044673 A1 | 2/2016 | Liu et al. | |
| 2016/0157168 A1 | 6/2016 | Xue et al. | |
| 2016/0261657 A1 | 9/2016 | Bruhn et al. | |
| 2016/0345323 A1 | 11/2016 | Krishnamoorthy et al. | |
| 2017/0026845 A1 | 1/2017 | Garg et al. | |
| 2017/0041949 A1 | 2/2017 | Ngo et al. | |
| 2017/0041954 A1 | 2/2017 | Tsai et al. | |
| 2017/0048728 A1 | 2/2017 | Ngo et al. | |
| 2017/0048864 A1 | 2/2017 | Ngo et al. | |
| 2017/0079007 A1 | 3/2017 | Carbajal | |
| 2017/0123049 A1 | 5/2017 | Tsai et al. | |
| 2017/0142728 A1 | 5/2017 | Tsai et al. | |
| 2017/0156113 A1 | 6/2017 | Visuri et al. | |
| 2017/0273084 A1 | 9/2017 | Yi et al. | |
| 2017/0290075 A1* | 10/2017 | Carbajal | H04W 16/14 |
| 2018/0020453 A1* | 1/2018 | Lin | H04W 72/0453 |
| 2018/0059213 A1 | 3/2018 | Wallstedt et al. | |
| 2018/0070253 A1* | 3/2018 | Kleinbeck | H04W 24/10 |

FOREIGN PATENT DOCUMENTS

| | | |
|---|---|---|
| EP | 3128779 | 2/2017 |
| JP | 2004-535095 A | 11/2004 |
| JP | 2005-523616 A | 8/2005 |
| JP | 2012-120033 A | 6/2012 |
| WO | 2007032790 A2 | 3/2007 |
| WO | 2007032790 A3 | 4/2009 |
| WO | 20140176503 | 10/2014 |
| WO | 2014190004 A1 | 11/2014 |

OTHER PUBLICATIONS

Office Action for U.S. Appl. No. 15/085,573, dated Jun. 24, 2016, 15 pages.

Notice of Allowance dated Jul. 19, 2016 for U.S. Appl. No. 15/085,573, 27 pages.

Office Action for U.S. Appl. No. 14/920,568, dated Sep. 30, 2016, 28 pages.

Notice of Allowance dated Apr. 12, 2017 for U.S. Appl. No. 15/171,911, 30 pages.

European Office Action dated Feb. 13, 2017 for European Application Serial No. 16182722.5, 2 pages.

Office Action for U.S. Appl. No. 15/428,658, dated May 10, 2017, 20 pages.

Office Action for U.S. Appl. No. 15/416,568, dated May 18, 2017, 39 pages.

Extended European Search Report for EP Patent Application 16200660.5, dated May 8, 2017, 6 pages.

(56) References Cited

OTHER PUBLICATIONS

Office Action for U.S. Appl. No. 14/920,568 dated Jun. 16, 2017, 51 pages.
Office Action for U.S. Appl. No. 15/225,966 dated Jul. 7, 2017, 37 pages.
Office Action for U.S. Appl. No. 15/259,386 dated Jul. 6, 2017, 43 pages.
Office Action for U.S. Appl. No. 15/588,474 dated Jul. 11, 2017, 21 pages.
Office Action for U.S. Appl. No. 15/454,805 dated May 11, 2017, 22 pages.
Office Action for U.S. Appl. No. 15/483,406 dated Aug. 4, 2017, 29 pages.
European Search Report for European Application Serial No. 17163289.6 dated Jul. 12, 2017, 11 pages.
Holma, et al., "LTE for UMTS. Evolution to LTE-advanced," Mar. 4, 2011, pp. 26-29, XP055386245.
Office Action for U.S. Appl. No. 15/450,940 dated Aug. 10, 2017, 28 pages.
Notice of Allowance for U.S. Appl. No. 14/920,568 dated Sep. 25, 2017, 27 pages.
Office Action for U.S. Appl. No. 15/711,649 dated Jan. 26, 2018, 28 pages.
Office Action for U.S. Appl. No. 15/613,726 dated Oct. 13, 2017, 28 pages.
European Office Action dated Oct. 9, 2017 for European Application Serial No. 17163289.6, 2 pages.
Notice of Allowance for U.S. Appl. No. 15/483,406 dated Nov. 7, 2017, 29 pages.
Notice of Allowance for U.S. Appl. No. 15/454,805 dated Aug. 16, 2017, 38 pages.
Office Action for Japanese Application No. 2016-153596 dated Dec. 12, 2017, 7 pages.
Office Action for U.S. Appl. No. 15/225,966 dated Nov. 7, 2017, 26 pages.
Office Action for U.S. Appl. No. 15/259,386 dated Dec. 18, 2017, 41 pages.
Office Action for U.S. Appl. No. 15/416,568, dated Nov. 17, 2017, 39 pages.
Notice of Allowance for U.S. Appl. No. 15/225,966 dated Jan. 19, 2018, 32 pages.
Extended European Search Report for EP Patent Application Serial No. 16182722.5, dated Dec. 15, 2016, 11 pages.
Kerry et al., "Liaison Statement on the Compatibility Between IEEE 802.11a and Radars in the Radiolocation and Radionavigation Service in the 5250-5350 MHz and 5470-5725 MHz bands", Jan. 2001, IEEE, 6 pages.
Extended European Search Report for EP Patent Application Serial No. 16182672.2, dated Dec. 16, 2016, 8 pages.
Office Action for U.S. Appl. No. 15/214,437 dated Jan. 23, 2017, 33 pages.
Office Action for U.S. Appl. No. 14/920,568, dated Jan. 20, 2017, 26 pages.
Extended European Search Report for EP Patent Application Serial No. 16187611.5, dated Jan. 30, 2017, 8 pages.
Office Action for U.S. Appl. No. 15/259,386, dated Jan. 9, 2017, 37 Pages.
Office Action for U.S. Appl. No. 15/171,911, dated Feb. 28, 2017, 34 Pages.
Office Action for U.S. Appl. No. 15/263,985, dated Mar. 7, 2017, 33 Pages.
Japanese Office Action for Japanese Patent Application No. 2016-142261 dated Jan. 16, 2018, 6 pages (with translation).
Notice of Allowance dated Jul. 3, 2017 for U.S. Appl. No. 15/263,985, 28 pages.
Final Office Action received for U.S. Appl. No. 15/711,649, dated Jun. 22, 2018, 30 Pages.
Decision to Grant a Patent received for Japanese Patent Application Serial No. 2016-153596, dated Mar. 27, 2018, 6 pages.
Communication pursuant to Rules 70(2) and 70a(2) EPC and reference to Rule 39(1) EPC for European Application Serial No. 16182672.2, dated Feb. 20, 2017, 2 pages.
Communication pursuant to Rules 70(2) and 70a(2) EPC and reference to Rule 39(1) EPC for European Application Serial No. 16187611.5, dated Mar. 13, 2017, 2 pages.
Communication pursuant to Rules 70(2) and 70a(2) EPC and reference to Rule 39(1) EPC for European Application Serial No. 16200660.5, dated Jun. 12, 2017, 2 pages.
Non-Final Office Action received for U.S. Appl. No. 15/715,239, dated Nov. 30, 2017, 20 pages.
Non-Final Office Action received for U.S. Appl. No. 15/416,568, dated Jun. 29, 2018, 43 pages.
Office Action dated Aug. 3, 2018 for U.S. Appl. No. 15/259,386, 44 pages.
Final Office Action dated Aug. 1, 2018 for U.S. Appl. No. 15/368,462, 64 pages.
Non-Final Office Action received for U.S. Appl. No. 15/950,689, dated Aug. 1, 2018, 35 pages.
Non-Final Office Action received for U.S. Appl. No. 15/214,431, dated Aug. 10, 2018, 60 pages.

\* cited by examiner

METHOD AND APPARATUS FOR PROVIDING DYNAMIC FREQUENCY SELECTION SPECTRUM ACCESS IN PEER-TO-PEER WIRELESS NETWORKS

CROSS REFERENCE TO RELATED APPLICATIONS

This application claims priority to U.S. Provisional Patent Application No. 62/314,042 titled METHOD AND APPARATUS FOR PROVIDING DYNAMIC FREQUENCY SELECTION SPECTRUM ACCESS IN PEER-TO-PEER WIRELESS NETWORKS and filed on Mar. 28, 2016, the disclosure of which is hereby incorporated herein by reference in its entirety. This application is a continuation-in-part of, and claims priority to, U.S. patent application Ser. No. 15/225,966 titled "METHOD AND APPARATUS FOR DIRECTED ADAPTIVE CONTROL OF DYNAMIC CHANNEL SELECTION IN WIRELESS NETWORKS" and filed on Aug. 2, 2016, which is a continuation of U.S. patent application Ser. No. 15/085,573 titled "METHOD AND APPARATUS FOR DIRECTED ADAPTIVE CONTROL OF DYNAMIC CHANNEL SELECTION IN WIRELESS NETWORKS" and filed on Mar. 30, 2016, which claims priority to U.S. Provisional Patent Application No. 62/203,383 titled "METHOD AND APPARATUS FOR DIRECTED ADAPTIVE CONTROL OF DYNAMIC CHANNEL SELECTION IN WIRELESS NETWORKS" and filed on Aug. 10, 2015. The entireties of the foregoing applications listed herein are hereby incorporated by reference.

BACKGROUND

The present invention relates to wireless networks and more specifically to a method and apparatus for providing dynamic frequency selection (DFS) spectrum access to peer-to-peer wireless networks. Embodiment of the present invention provide DFS master services for peer-to-peer networks including DFS master services from a DFS master with no direct network connection of its own. Embodiments of the present invention also enable DFS peer-to-peer networks using a system that includes a standalone DFS master coupled to a client device and configured to collect and/or generate spectral information associated with a plurality of communication channels. The system includes a cloud intelligence engine that is coupled to the client device and configured to receive the spectral information via the client device. The cloud intelligence engine is further configured to determine one or more communication channels for the standalone multi-channel DFS master from the plurality of communication channels and to communicate that information to the standalone DFS master.

Wi-Fi networks are crucial to today's portable modern life. Indeed, Wi-Fi is the preferred network in the growing Internet-of-Things (IoT). But, the technology behind current Wi-Fi has changed little in the last ten years. Most Wi-Fi networks are deployed in infrastructure mode. In infrastructure mode, a base station acts as a wireless access point, and nodes (e.g., client devices) communicate through the access point. The access point often has a wired or fiber network connection to a wide-area network and may have permanent wireless connections to other nodes. Wireless access points are usually fixed, and provide service to the client nodes that are within range. Wireless clients, such as laptops, smartphones, televisions etc. connect to the access point to join the network.

Other Wi-Fi networks use peer-to-peer communication. For example, an ad hoc network is a network where stations communicate only in a peer to peer manner. In an ad hoc network, devices are not communicating through a pre-established infrastructure or network. Wi-Fi Direct is another type of network where stations communicate peer to peer. In a Wi-Fi Direct group, a group owner is established and all other devices in the network communicate with the group owner. A peer-to-peer network allows wireless devices to directly communicate with each other. Wireless devices within range of each other can discover and communicate directly without involving central access points. Peer-to-peer networks may be used, for example, by two computers so that they can connect to each other to form a network. Also video cameras may connect directly to a computer to download video or images files using a peer-to-peer network. Additionally, device connections to external monitors and device connections to drones currently use peer-to-peer networks. For example, peer-to-peer networks are used to transfer or stream media from devices like mobile phones, tablets, and computers to Wi-Fi enabled displays and televisions. As media content increases in size and frequency of use, and as the Wi-Fi spectrum becomes more crowded, users will experience increasing difficulty with conventional peer-to-peer networks. And in a peer-to-peer network without an access point, DFS channels cannot be employed since there is no access point to control DFS channel selection and/or to tell devices which DFS channels to use. The present invention overcomes this limitation.

Devices operating in the DFS channels, require active radar detection. This function is assigned to a device capable of detecting radar known as a DFS master, which is typically an access point or router. The DFS master actively scans the DFS channels and performs a channel availability check (CAC) and periodic in-service monitoring (ISM) after the channel availability check. The channel availability check lasts 60 seconds as required by the Federal Communications Commission (FCC) Part 15 Subpart E and ETSI 301 893 standards. The DFS master signals to the other devices in the network (typically client devices) by transmitting a DFS beacon indicating that the channel is clear of radar. Although the access point can detect radar, wireless clients typically cannot. Because of this, wireless clients must first passively scan DFS channels to detect whether a beacon is present on that particular channel. During a passive scan, the client device switches through channels and listens for a beacon transmitted at regular intervals by the access point on an available channel.

Once a beacon is detected, the client is allowed to actively transmit on that channel. If the DFS master detects radar in that channel, the DFS master no longer transmits the beacon, and all client devices upon not sensing the beacon within a prescribed time must vacate the channel immediately and remain off that channel for 30 minutes. For clients associated with the DFS master network, additional information in the beacons (i.e. the channel switch announcement) can trigger a rapid and controlled evacuation of the channel. Normally, a DFS master device is an access point with only one radio and is able to provide DFS master services for just a single channel. Significant problems of this approach include: (1) DFS utilization is not available in peer-to-peer networks without an access point; (2) the DFS master channel availability check time (60 seconds) required when entering a channel would render many peer-to-peer applications unusable (waiting for a peer in a Wi-Fi peer-to-peer connection to perform the DFS master role and look for radar would result in a 60-seconds wait before a file transfer or video setup even starts); and (3) in the event of a radar event or a more-common false-detect, the single channel must be vacated and the ability to use DFS channels is lost. This disclosure recognizes and addresses, in at least certain embodiments, the problems with current devices for detecting occupying signals including current DFS devices.

SUMMARY

The present invention relates to wireless networks and more specifically to a method and apparatus for providing dynamic frequency selection (DFS) spectrum access in peer-to-peer wireless networks. Embodiments of the present invention include a standalone DFS master coupled to a client device and configured to collect and/or generate spectral information associated with a plurality of communication channels (e.g., a plurality of 5 GHz communication channels, a plurality of 5.9 GHz communication channels, a plurality of 3.5 GHz communication channels, etc., for simplicity the following examples in this application use the 5 GHz example) and a cloud intelligence engine that is also coupled to the client device and configured to receive the spectral information via the client device. The cloud intelligence engine is configured to determine one or more communication channels for the standalone multi-channel DFS master from the plurality of communication channels.

In an embodiment, the present invention includes a system with a client device (such as a mobile device, computer, television, or tablet), a standalone multi-channel DFS master, and a cloud intelligence engine. The client device communicates with both the standalone multi-channel DFS master and the cloud intelligence engine. The standalone multi-channel DFS master does not require an access point to connect to the cloud intelligence engine. Instead, the standalone multi-channel DFS master connects to the cloud intelligence engine via the client device's network connection (a mobile device's cellular connection for example). The standalone multi-channel DFS master scans the DFS spectrum performing channel availability checks and in-service monitoring and collects and/or generates spectral information associated with a plurality of 5 GHz DFS communication channels from those scans. The cloud intelligence engine receives the spectral information via the first client device, integrates the spectral information with other spectral information to generate integrated spectral information, and determines a list of one or more communication channels that are available for communication for the standalone multi-channel DFS master based at least on the integrated spectral information.

The present invention may also include using the standalone multi-channel DFS master to collect and/or generate spectral information associated with a plurality of 5 GHz DFS radio channels for the standalone multi-channel DFS master followed by transmitting the spectral information to the cloud intelligence engine through the network connection in the client device. Then the cloud intelligence engine generates integrated spectral information by integrating the spectral information with other spectral information and determines a set of one or more available DFS radio channels for the multi-channel DFS master based at least on the integrated spectral information.

Other embodiments and various examples, scenarios and implementations are described in more detail below. The following description and the drawings contain illustrative embodiments of the specification. These embodiments are indicative, however, of but a few of the various ways in which the principles of the specification may be employed.

Other advantages and novel features of the embodiments described will become apparent from the following detailed description of the specification when considered in conjunction with the drawings.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which.

DETAILED DESCRIPTION

Figure 1:
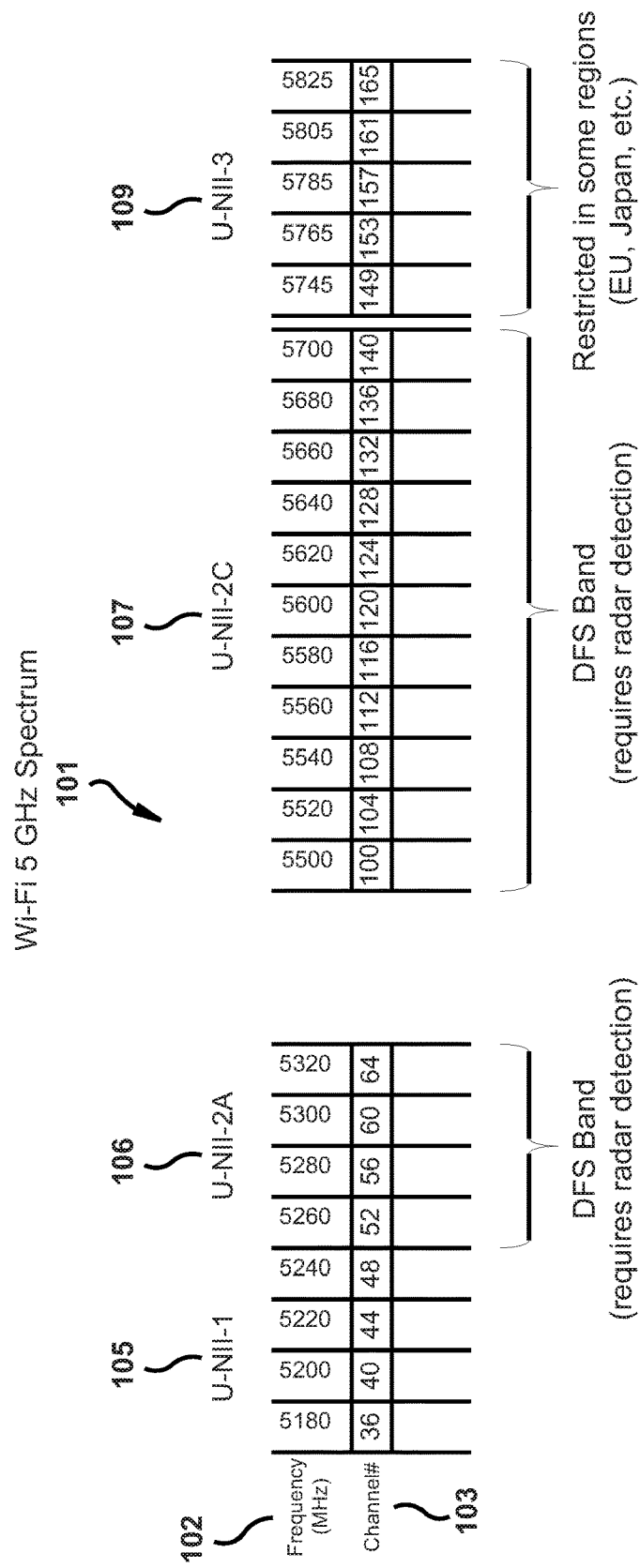
FIG. 1 illustrates portions of the 5 GHz Wi-Fi spectrum including portions that require active monitoring for radar signals.

The present invention relates to wireless networks and more specifically to a method and apparatus for providing DFS spectrum access in peer-to-peer wireless networks. Embodiments of the present invention include a standalone DFS master coupled to a client device and configured to collect and/or generate spectral information associated with a plurality of 5 GHz DFS communication channels and a cloud intelligence engine that is also coupled to the client device and configured to receive the spectral information via the client device. The cloud intelligence engine is configured to determine one or more communication channels for the standalone multi-channel DFS master from the plurality of 5 GHz DFS communication channels. It is to be appreciated that the cloud intelligence engine can be a set of cloud intelligence devices associated with cloud-based distributed computational resources. For example, the cloud intelligence engine can be associated with multiple devices, multiple servers, multiple machines and/or multiple clusters.

In an embodiment, the present invention includes a system with a client device (such as a mobile device, computer, television, or tablet), a standalone multi-channel DFS master, and a cloud intelligence engine. The client device communicates with both the standalone multi-channel DFS master and the cloud intelligence engine. The standalone multi-channel DFS master does not require an access point to connect to the cloud intelligence engine. Instead, the standalone multi-channel DFS master connects to the cloud intelligence engine via the client device's network connection (a mobile device's cellular connection for example).

The standalone multi-channel DFS master scans the DFS spectrum performing channel availability checks and in-service monitoring and collects and/or generates spectral information associated with a plurality of 5 GHz DFS communication channels from those scans. The cloud intelligence engine receives the spectral information via the first client device, integrates the spectral information with other spectral information to generate integrated spectral information, and determines one or more communication channels that are available for communication for the standalone multi-channel DFS master based at least on the integrated spectral information. The integrated spectral information may also be location-tagged and/or time-stamped.

The present invention may also include using the standalone multi-channel DFS master to collect and/or generate spectral information associated with a plurality of 5 GHz DFS radio channels for the standalone multi-channel DFS master followed by transmitting the spectral information to the cloud intelligence engine through the network connection in the client device. Then the cloud intelligence engine generates integrated spectral information by integrating the spectral information with other spectral information and determines a set of available DFS radio channels for the multi-channel DFS master based at least on the integrated spectral information.

In accordance with yet another implementation of the present invention, a system includes a standalone DFS device configured to collect and/or generate spectral information associated with a plurality of 5 GHz DFS radio channels based on an analysis of the plurality of 5 GHz DFS radio channels and a cloud intelligence engine configured to receive the spectral information via a client device, integrate the spectral information with other spectral information to generate integrated spectral information, and determine a set of one or more DFS radio channels for the standalone DFS device from the plurality of 5 GHz DFS radio channels based at least on the integrated spectral information, wherein the other spectral information is generated by at least one other DFS device configured to analyze the plurality of 5 GHz DFS radio channels.

FIG. 1 illustrates portions of a 5 GHz Wi-Fi spectrum 101. FIG. 1 shows frequencies 102 and channels 103 that make up portions of the 5 GHz Wi-Fi spectrum 101. The channels 103 of the GHz Wi-Fi spectrum 101 may be a plurality of 5 GHz communication channels (e.g., a plurality of 5 GHz radio channels). A U-NII band is an FCC regulatory domain for 5-GHz wireless devices and is part of the radio frequency spectrum used by IEEE 802.11ac/n devices and by many wireless internet service providers. The U-NII band operates over four ranges. For example, a U-NII-1 band 105 covers the 5.15-5.25 GHz range of the 5 GHz Wi-Fi spectrum 101, a U-NII-2A band 106 covers the 5.25-5.35 GHz range of the 5 GHz Wi-Fi spectrum 101, a U-NII-2C band 107 covers the 5.47-5.725 GHz range of the 5 GHz Wi-Fi spectrum 101, and a U-NII-3 band 109 covers the 5.725-5.850 GHz range of the 5 GHz Wi-Fi spectrum 101. The U-NII-2A band 106 is subject to DFS radar detection and avoidance requirements. The U-NII-2C band 107 is also subject to DFS radar detection and avoidance requirements. Use of the U-NII-3 band 109 is restricted in some jurisdictions like the European Union and Japan.

In contrast to conventional DFS master devices, the standalone DFS master of the present invention is not an access point or router. Moreover, the standalone DFS master does not require an access point (e.g., a wireless router) to connect to the cloud intelligence engine. Instead, the standalone DFS master is a standalone wireless device employing inventive scanning techniques that provide DFS scan capabilities across multiple channels, enabling peer-to-peer client devices to exploit simultaneous multiple DFS channels. The standalone autonomous DFS master may be incorporated into another device such as a media or content streamer, speaker, television, mobile phone, mobile router, or peer-to-peer device but does not itself provide network access to client devices. Nevertheless, in the event of a radar event or a false-detect, the DFS master enables the client devices to move automatically, predictively and very quickly to another DFS channel.

Figure 2:
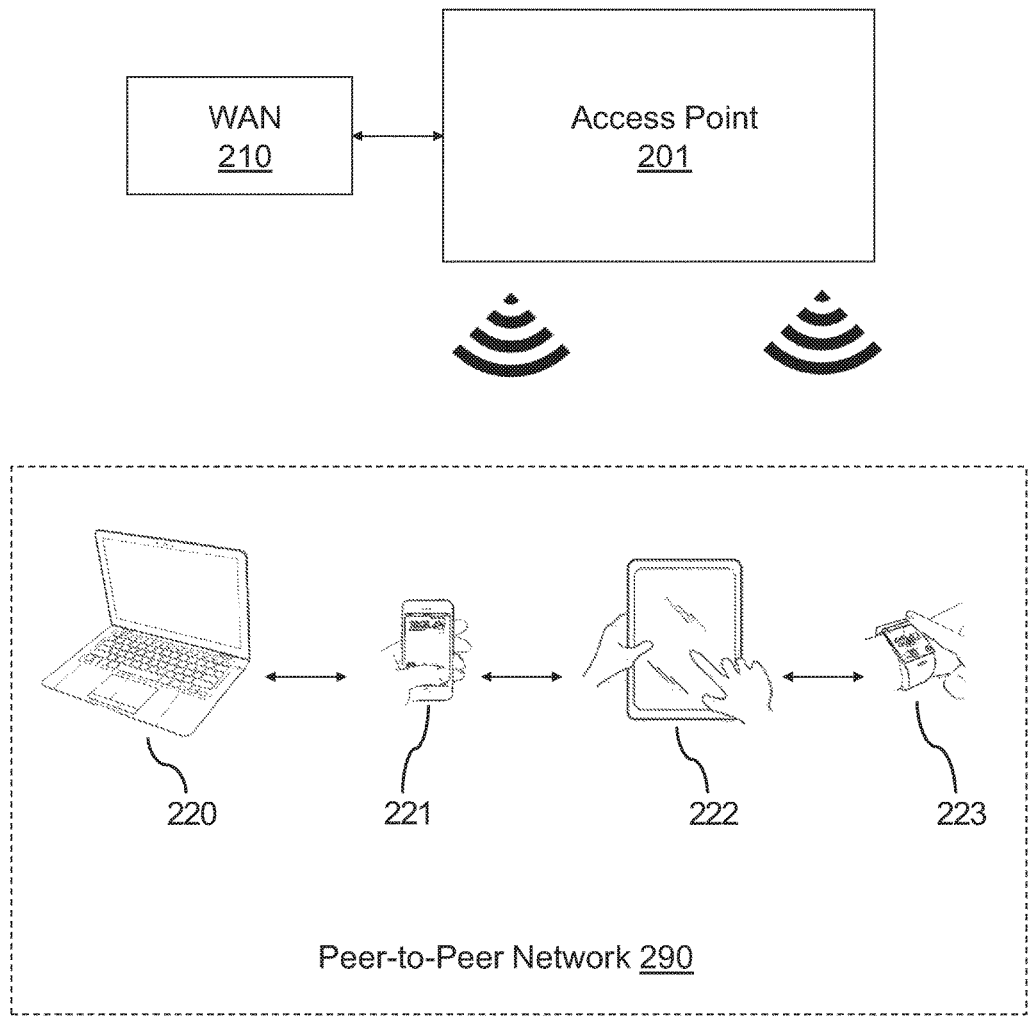
FIG. 2 illustrates a standard non-DFS enabled peer-to-peer network.

FIG. 2 provides an illustration of a standard peer-to-peer network 290. As shown in FIG. 2, an access point 201 such as a wireless access point is connected to a wide area network (WAN) 210. The access point 201 provides wireless access to the wide area network 210 to the client devices 220, 221, 222, 223. The client devices 220, 221, 222, 223 also form a peer-to-peer network 200 through which the client devices 220, 221, 222, 223 can communicate with each other without utilizing the access point 201. Note that in this configuration, the client devices 220, 221, 222, 223 cannot use DFS channels to communicate with each other because they may not have sufficient capability or information about available DFS channels to allow DFS communication that complies with regulatory standards. Indeed, some devices may not have the capability to detect radar, due to legacy designs or operating constraints (for example battery operated devices where constant monitoring is a drain). Insufficient information affects how a peer to peer application starts, for example due to regulatory compliance a device may have to wait 60 seconds before establishing a connection. Without knowing there is radar present or not a priori, an application can be delayed by up to 60 seconds. For many peer-to-peer applications, this delay is intolerable.

Figure 3:
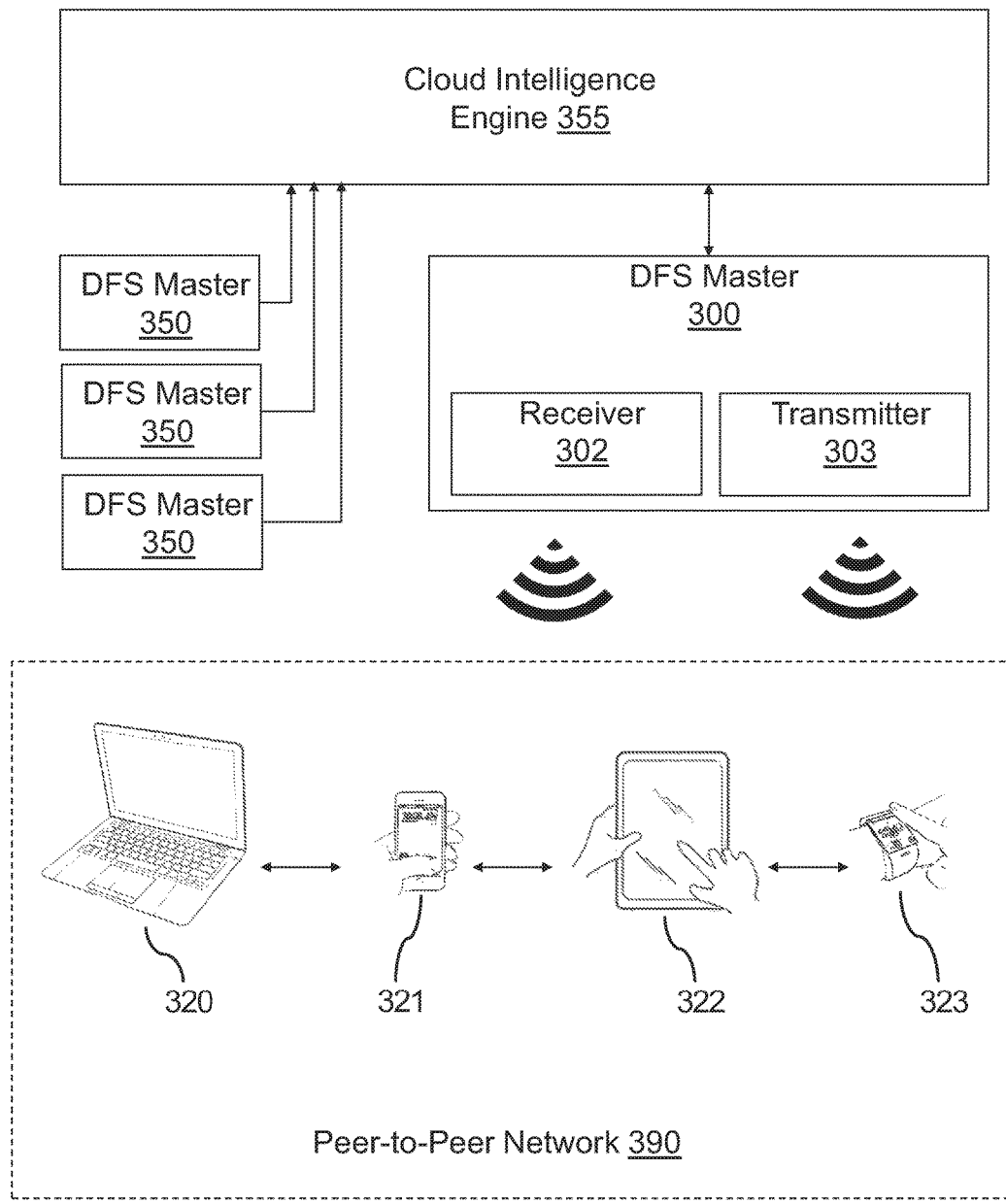
FIG. 3 illustrates an exemplary DFS enabled peer-to-peer network and system of the present invention.

FIG. 3 illustrates an embodiment of the present invention in which a DFS master 300 is coupled to a cloud intelligence engine 355 and provides available DFS channels to client devices 320, 321, 322, 323. As show in this illustration, the DFS master 300 includes a receiver 302 and a transmitter 303. The DFS master 300 provides spectral information to the cloud intelligence engine 355. Further, the cloud intelligence engine 355 is coupled to other DFS masters or sensors 350 that provide additional spectral information to the cloud intelligence engine 355. The DFS master 300 may broadcast a beacon to client devices 320, 321, 322, 323 to notify the client devices 320, 321, 322, 323 of the available DFS channels. Also, the DFS master 300 can connect to one or more of the client devices 320, 321, 322, 323 via an installed application on the client devices 320, 321, 322, 323, for example, to communicate the available DFS channels. Alternatively, the cloud intelligence engine 355 can connect to one or more of the client devices 320, 321, 322, 323 via an installed application on the client devices 320, 321, 322, 323, for example, to communicate the available DFS channels. Using the available DFS channels, the client devices 320, 321, 322, 323 can communicate directly with each other in a peer-to-peer network 390.

Figure 4:
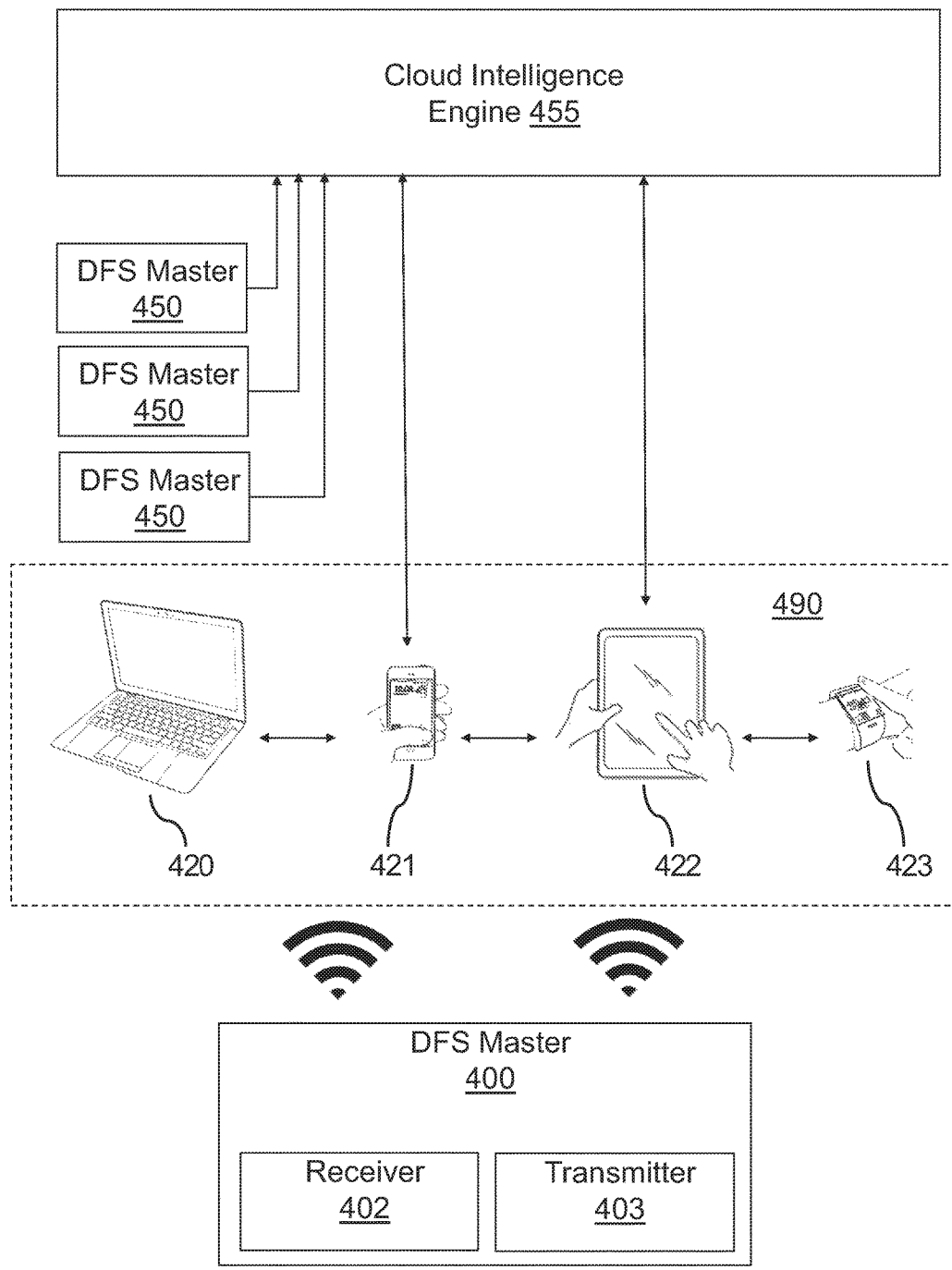
FIG. 4 illustrates an exemplary DFS enabled peer-to-peer network and system of the present invention.

FIG. 4 illustrates another embodiment of the present invention in which the DFS master 400 is not directly connected to the cloud intelligence engine 455. As show in this illustration, the DFS master 400 includes a receiver 402 and a transmitter 403. The DFS master 400 provides spectral information to the cloud intelligence engine 455. Further, the cloud intelligence engine 455 is coupled to other DFS masters 450 that provide additional spectral information to the cloud intelligence engine 455. The DFS master 400 connects to and communicates with the cloud intelligence engine 455 via a network connection in the client devices 421, 422. In this illustration, the DFS master 400 connects to and communicates with the cloud intelligence engine 455 via a network connection in two client devices 421, 422, but the DFS master 400 may connect to and communicate with the cloud intelligence engine 455 via a network connection in one or more client devices. Via this connection, the DFS master 400 transmits spectral information to the cloud intelligence engine 455 and receives DFS channel availability information from the cloud intelligence engine 455. The DFS master 400 may broadcast a beacon to client devices 420, 421, 422, 423 to notify the client devices 420, 421, 422, 423 of the available DFS channels. The DFS master may supply this information on other radio bands or via other radio technologies (i.e. Bluetooth) and the information can be mirrored or augmented on other radios interfaces. Also, the DFS master 400 can connect to one or more of the client devices 420, 421, 422, 423 via an installed application on the client devices 420, 421, 422, 423, for example, to communicate the available DFS channels. Alternatively, the cloud intelligence engine 455 can connect to one or more of the client devices 421, 422 via an installed application on the client devices 421, 422, for example, to communicate the available DFS channels. Using the available DFS channels, the client devices 420, 421, 422, 423 can communicate directly with each other in a peer-to-peer network 490.

Figure 5:
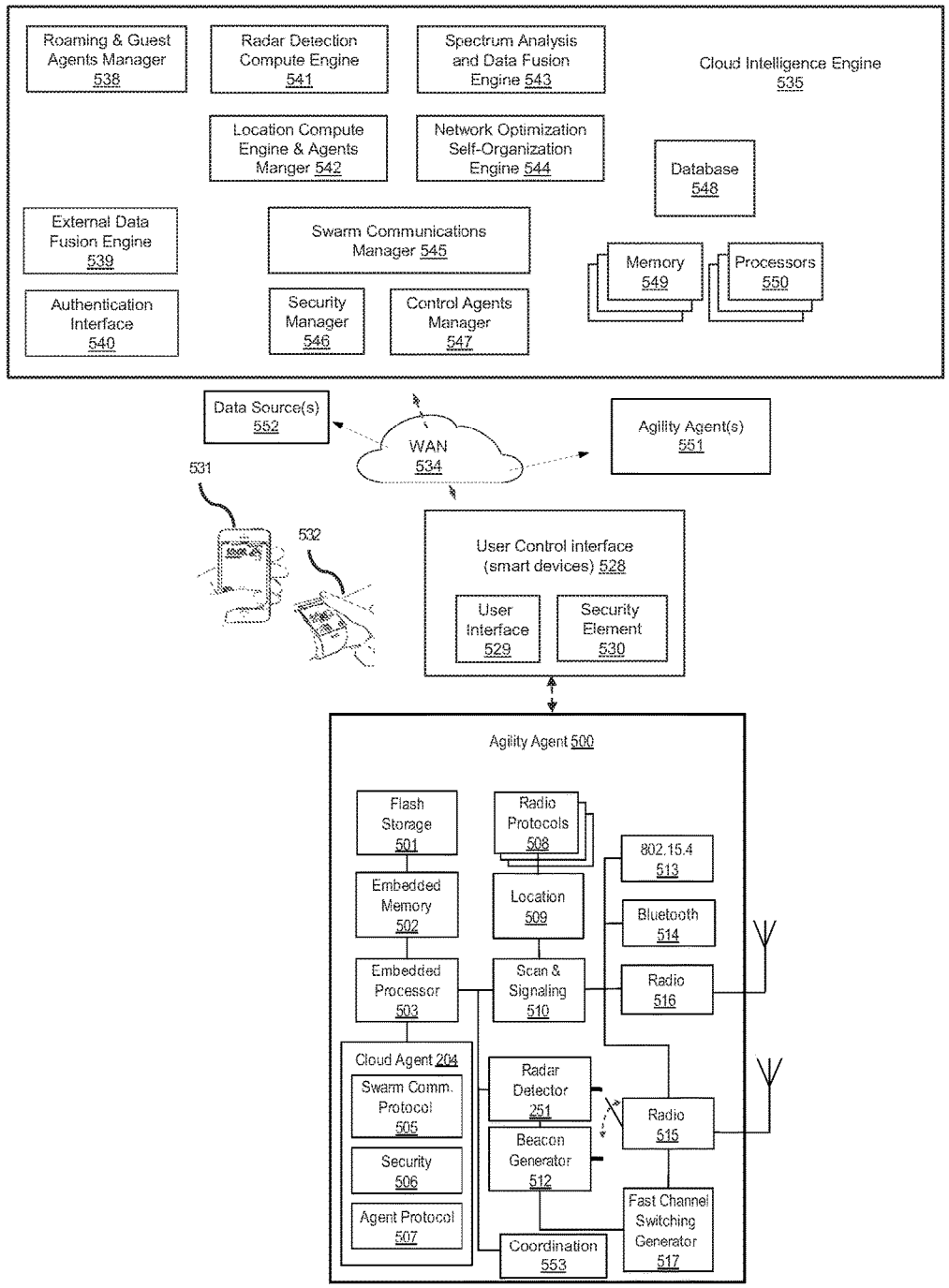
FIG. 5 illustrates an exemplary DFS enabled peer-to-peer network and system of the present invention.

FIG. 5 provides a more-detailed illustration of an exemplary system of the present invention. As illustrated in FIG. 5, the cloud intelligence engine 535 may be connected to a plurality of DFS masters 500 and client or user devices 531, 532 that form a peer-to-peer network. The peer-to-peer devices 531, 532 may have a user control interface 528. The user control interface 528 includes a user interface 529 to allow the client devices 531, 532 to interact with the DFS master 500 via the cloud intelligence engine 535. For example, the user interface 529 may allow the user to modify DFS master 500 settings. The user control interface 528 also includes a security element 530 to ensure that communications between the client devices 531, 532 and the DFS master 500 are secure. The client devices 531, 532 are connected to a wide area network 534 via a cellular network for example.

The cloud intelligence engine 535 includes a database 548 and memory 549 for storing information from the DFS master 500, one or more other DFS masters connected to the cloud intelligence engine 535 and/or one or more external data source (e.g., data source(s) 552). The database 548 and memory 549 allow the cloud intelligence engine 535 to store information associated with the DFS master 500, the other DFS master(s) and/or the data source(s) 552 over a certain period of time (e.g., days, weeks, months, years, etc.). The data source(s) 552 may be associated with a set of databases. Furthermore, the data source(s) 552 may include regulatory information (e.g., non-spectral information) such as, but not limited to, geographical information system (GIS) information, other geographical information, FCC information regarding the location of radar transmitters, FCC blacklist information, National Oceanic and Atmospheric Administration (NOAA) databases, Department of Defense (DOD) information regarding radar transmitters, DOD requests to avoid transmission in DFS channels for a given location, and/or other regulatory information.

The cloud intelligence engine 535 also includes processors 550 to perform the cloud intelligence operations described herein. In an aspect, the processors 550 may be communicatively coupled to the memory 549. Coupling can include various communications including, but not limited to, direct communications, indirect communications, wired communications, and/or wireless communications. In certain implementations, the processors 550 may be operable to execute or facilitate execution of one or more of computer-executable components stored in the memory 549. For example, the processors 550 may be directly involved in the execution of the computer-executable component(s), according to an aspect. Additionally or alternatively, the processors 550 may be indirectly involved in the execution of the computer executable component(s). For example, the processors 550 may direct one or more components to perform the operations.

The cloud intelligence engine 535 also knows the location of each DFS master and the access points proximate to the DFS masters that do not have a controlling agent as well as the channel on which each of those devices is operating. With this information, the spectrum analysis and data fusion engine 543 and the network optimization self-organization engine 544 can optimize the local spectrum by telling DFS masters to avoid channels subject to interference. The swarm communications manager 545 manages communications between DFS masters, access points, client devices, and other devices in the network. The cloud intelligence engine includes a security manager 546. The control agents manager 547 manages all connected control agents.

The cloud intelligence engine 535 may combine the spectral information with other spectral information (e.g., other spectral information associated with DFS master(s)) to generate combined spectral information. Then, the cloud intelligence engine 535 may determine one or more particular communication channels (e.g., a particular communication channel associated with the 5 GHz Wi-Fi spectrum 101) and may communicate the particular communication channels to the DFS master 500 (e.g., via a secure communications tunnel through the client devices 531, 532). The DFS master 500 and/or the cloud intelligence engine 535 use the information from the cloud intelligence engine 535 to determine the DFS channels to make available to client devices 531, 532.

Independent of any host access point, the DFS master 500, in the role of an autonomous DFS master device, may provide the channel indication and channel selection control to one or more peer-to-peer client devices 531, 532 within the coverage area by (a) signaling availability of one or more DFS channels by simultaneous transmission of one or more beacon signals; (b) transmitting a listing of both the authorized available DFS channels, herein referred to as a whitelist and the prohibited DFS channels in which a potential radar signal has been detected, herein referred to as a blacklist along with control signals and a time-stamp signal, herein referred to as a dead-man switch timer via an associated non-DFS channel; and (c) receiving control, coordination and authorized and preferred channel selection guidance information from the cloud intelligence engine 535.

The capability and functions in (a) to (c) are enabled by the centralized cloud intelligence engine which collects and combines the DFS radar and other spectrum information from each DFS master and geo-tags, stores, filters, and integrates the data over time, and combines it together by data fusion technique with information from a plurality of other DFS masters distributed in space, and performs filtering and other post-processing on the collection with proprietary algorithms, and merges with other data from vetted sources (such as GIS—Geographical Information System, FAA, FCC, and DOD databases, etc.).

Specifically, the cloud intelligence engine performs the following: (a) continuously collects the spectrum, location and network congestion/traffic information from all wireless DFS masters, the number and density of which grows rapidly as more access points and small cell base stations are deployed; (b) continuously applies sophisticated filtering, spatial and time correlation and integration operations, and novel array-combining techniques, and pattern recognition, etc. across the data sets; (c) applies inventive network analysis and optimization techniques to compute network organization decisions to collectively optimize dynamic channel selection of access points and small cell base stations across networks; and (d) directs the adaptive control of dynamic channel selection and radio configuration of said wireless DFS masters.

In the illustrated example, the DFS master 500 includes a primary radio 515 and a secondary radio 516. The primary radio 515 is for DFS and radar detection. The primary radio 515 is typically a 5 GHz radio. In one example, the primary radio 515 can be a 5 GHz transceiver. The DFS master 500 may receive radar signals, traffic information, and/or congestion information through the primary radio 515. And the DFS master 500 may transmit information, such as DFS beacons, via the primary radio 515. The secondary radio 516 is a secondary radio for sending control signals to other devices in the network. The secondary radio 516 is typically a 2.4 GHz radio. The DFS master 500 may receive information such as network traffic, congestion, and/or control signals with the secondary radio 516. And the DFS master 500 may transmit information, such as control signals, with the secondary radio 516. The primary radio 515 is connected to a fast channel switching generator 517 that includes a switch and allows the primary radio 515 to switch rapidly between a radar detector 511 and beacon generator 512. The fast channel switching generator 517 allows the radar detector 511 to switch sufficiently fast to appear to be on multiple channels at a time. In certain implementations, the DFS Master 500 may also include coordination 553. The coordination 553 may provide cross-network coordination between the DFS Master 500 and another DFS master or agility agent (e.g., agility agent(s) 551). For example, the coordination 553 may provide coordination information (e.g., precision location, precision position, channel allocation, a time-slice duty cycle request, traffic loading, etc.) between the DFS Master 500 and another agility agent (e.g., agility agent(s) 551) on a different network. In one example, the coordination 553 may enable an agility agent (e.g., DFS Master 500) attached to a Wi-Fi router to coordinate with a nearby agility agent (e.g., agility agent(s) 551) attached to a LTE-U small cell base station.

The standalone multi-channel DFS master may include a beacon generator 512 to generate a beacon in each of a plurality of 5 GHz DFS radio channels (e.g., a plurality of 5 GHz DFS radio channels associated with the 5 GHz Wi-Fi spectrum 101), a radar detector 511 to scan for a radar signal in each of the plurality of 5 GHz DFS radio channels, a 5 GHz radio transceiver (e.g., the primary radio 515) to transmit the beacon in each of the plurality of 5 GHz DFS radio channels and to receive the radar signal in each of the plurality of 5 GHz DFS radio channels, and a fast channel switching generator 517 coupled to the radar detector, the beacon generator, and the 5 GHz radio transceiver. The fast channel switching generator 517 switches the 5 GHz radio to a first channel of the plurality of 5 GHz DFS radio channels and then causes the beacon generator 512 to generate the beacon in the first channel of the plurality of 5 GHz DFS radio channels. Then, the fast channel switching generator 517 causes the radar detector 511 to scan for the radar signal in the first channel of the plurality of 5 GHz DFS radio channels. The fast channel switching generator 517 then repeats these steps for each other channel of the plurality of 5 GHz DFS radio channels during a beacon transmission duty cycle and, in some examples, during a radar detection duty cycle. The beacon transmission duty cycle is the time between successive beacon transmissions on a given channel and the radar detection duty cycle which is the time between successive scans on a given channel. Because the DFS master 500 cycles between beaconing and scanning in each of the plurality of 5 GHz DFS radio channels in the time window between a first beaconing and scanning in a given channel and a subsequent beaconing and scanning the same channel, it can provide effectively simultaneous beaconing and scanning for multiple channels.

The DFS master 500 also may contain a Bluetooth radio 514 and/or an 802.15.4 radio 513 for communicating with other devices in the network. The DFS master 500 may include various radio protocols 508 to facilitate communication via the included radio devices.

The DFS master 500 may also include a location module 509 to geolocate or otherwise determine the location of the DFS master 500. Information provided by the location module 209 may be employed to location-tag and/or time-stamp spectral information collected and/or generated by the DFS master 500. In addition, the DFS master 500 may determine the location of the DFS master 500 by querying the client devices 531, 532, which may have GPS or other location-determining capabilities.

As shown in FIG. 5, the DFS master 500 may include a scan and signaling module 510. The DFS master 500 includes embedded memory 502, including for example flash storage 501, and an embedded processor 503. The cloud agent 504 in the DFS master 500 facilitates aggregation of information from the cloud agent 504 through the cloud and includes swarm communication protocols 505 to facilitate communications between DFS masters, access points, client devices, and other devices in the network. The cloud agent 504 also includes a security module 506 to protect and secure the cloud communications of the DFS master 500, as well as agent protocols 507 to facilitate communication.

The roaming and guest agents manager 538 in the cloud intelligence engine 535 provides optimized connection information for devices connected to DFS masters that are roaming from one access point to another access point (or from one access point to another network). The roaming and guest agents manager 538 also manages guest connections to networks for DFS masters connected to the cloud intelligence engine 535. The external data fusion engine 539 provides for integration and fusion of information from DFS masters with information from the data source(s) 552. For example, the external data fusion engine 539 may integrate and/or fuse information such as, but not limited to, GIS information, other geographical information, FCC information regarding the location of radar transmitters, FCC blacklist information, NOAA databases, DOD information regarding radar transmitters, DOD requests to avoid transmission in DFS channels for a given location, and/or other information. The cloud intelligence engine 535 further includes an authentication interface 540 for authentication of received communications and for authenticating devices and users. The radar detection compute engine 541 aggregates radar information from the DFS master 500, the DFS master(s) 551 and/or the data source(s) 552. The radar detection compute engine 541 also computes the location of radar transmitters from those data to, among other things, facilitate identification of false positive radar detections or hidden nodes and hidden radar. The radar detection compute engine 541 may also guide or steer multiple DFS masters to dynamically adapt detection parameters and/or methods to further improve detection sensitivity. The location compute and agents manager 542 determines the location of the DFS master 500 and other connected devices (e.g., DFS master(s) 251) through Wi-Fi lookup in a Wi-Fi location database, querying passing devices, triangulation based on received signal strength indication (RSSI), triangulation based on packet time-of-flight, scan lists from DFS masters, or geometric inference.

The spectrum analysis and data fusion engine 543 and the network optimization self-organization engine 544 facilitate dynamic spectrum optimization with information from the DFS master 500, the other DFS master(s) and/or the data source(s) 552. Each of the DFS masters (e.g., the DFS master 500 and/or the other DFS master(s)) connected to the cloud intelligence engine 535 have scanned and analyzed the local spectrum and communicated that information to the cloud intelligence engine 535.

The DFS master 500 sends the time-stamp signal, or dead-man switch timer, with communications to ensure that the devices do not use the information, including the whitelist, beyond the useful lifetime of the information. For example, a whitelist will only be valid for a certain period of time. The time-stamp signal avoids using noncompliant DFS channels by ensuring that a device will not use the whitelist beyond its useful lifetime.

Figure 6:
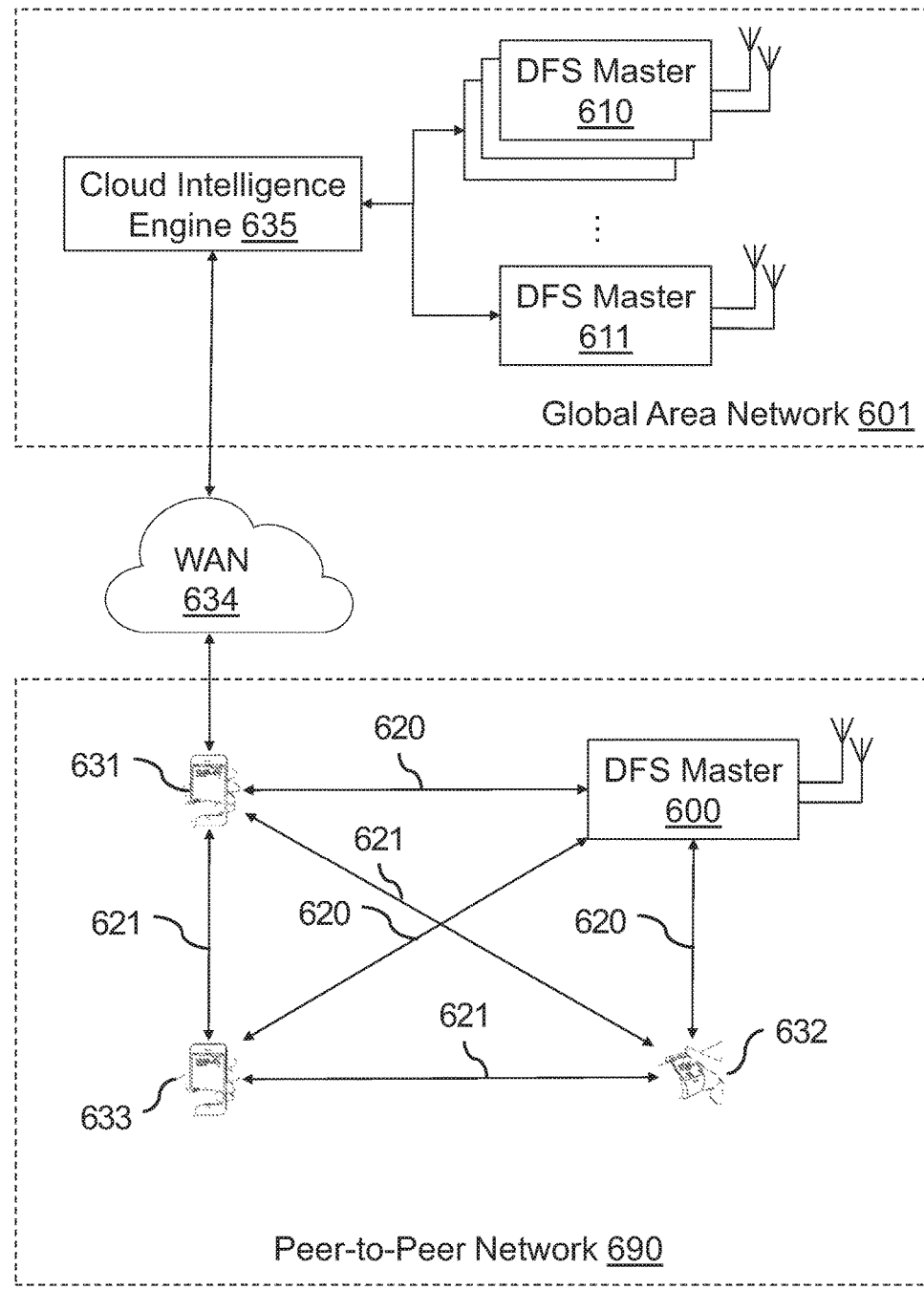
FIG. 6 illustrates an exemplary DFS enabled peer-to-peer network and system of the present invention.

FIG. 6 illustrates how the cloud intelligence engine 635 would interface with client devices 631, 632, 633 in a peer-to-peer network 690 and the DFS master 600 acting as an autonomous DFS master independent of any access point. As shown in FIG. 6, the cloud intelligence engine 635 may be connected to a plurality of network-connected (either directly or via network enabled devices) DFS masters 600, 610. The DFS master 600 in the peer-to-peer network 600 may connect to the cloud intelligence engine 635 through one of the network-connected client devices 631 by, for example, piggy-backing a message to the cloud intelligence engine 635 on a message send to the client devices 631 or otherwise co-opting a connection of the client devices 631 to the wide area network 634. In the peer-to-peer network 600, the DFS master 600 sends over-the-air control signals 620 to the client devices 631, 632, 633 including indications of channels free of occupying signals such as DFS channels free of radar signals. Alternatively, the DFS master communicates with just one client device 631 (e.g., a single client device 631) which then acts as the group owner to initiate and control the peer-to-peer communications with other client devices 632, 633. The client devices 631, 632, 633 have peer-to-peer links 621 through which they communicate with each other. The DFS master 600 may operate in multiple modes executing a number of DFS scan methods employing different algorithms.

Figure 7:
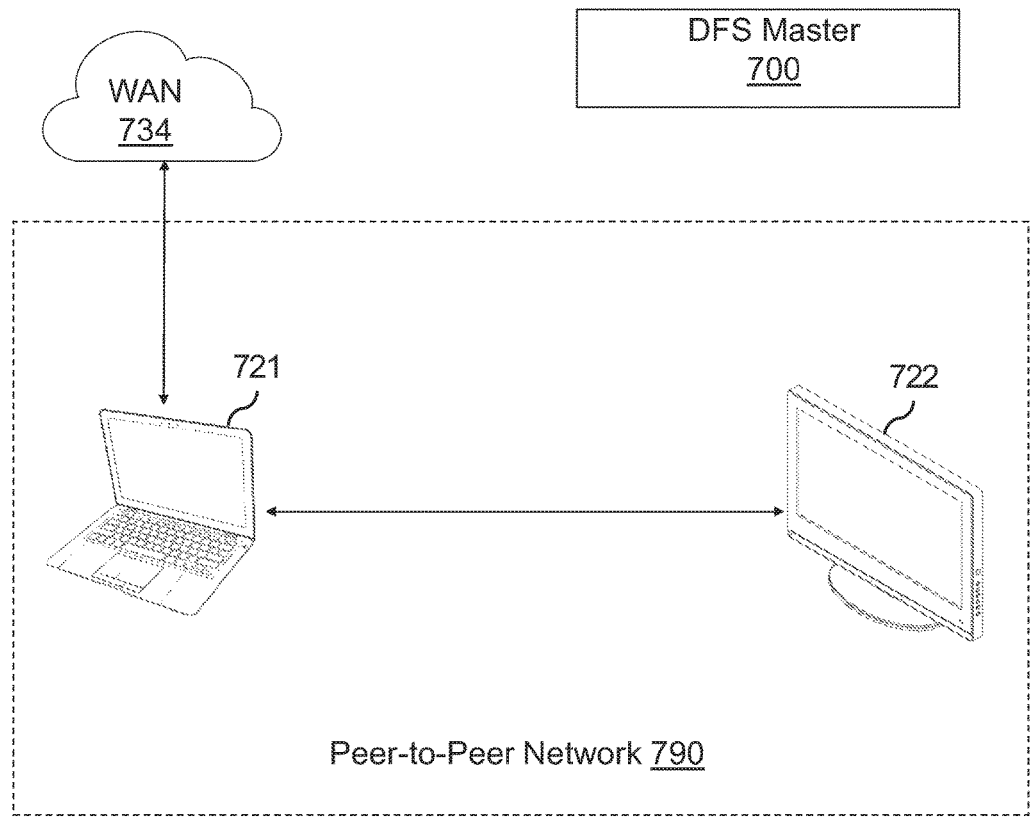
FIG. 7 further illustrates a type of DFS peer-to-peer network that is enabled by the present invention.
Figure 8:
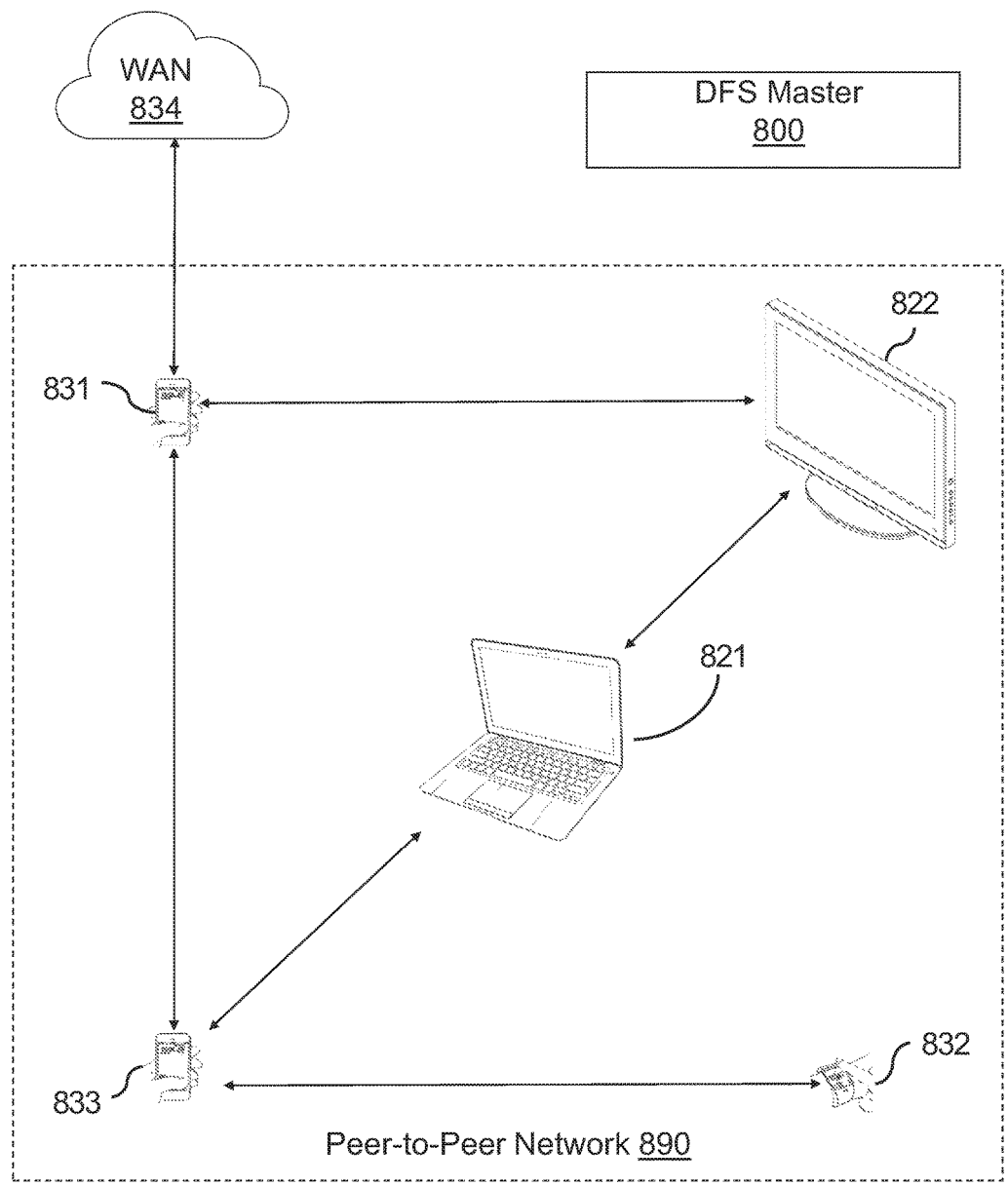
FIG. 8 further illustrates a type of DFS peer-to-peer network that is enabled by the present invention.

FIGS. 7 and 8 further illustrate DFS peer-to-peer networks that are enabled by the present invention. As shown in FIG. 7, a computer client device 721 may be coupled to a wide area network 734. Independent of any access point, the computer client device 721 communicates via a DFS channel with a television client device 722 and forms a peer-to-peer network 790. The DFS master device 700 communicates with at least one of the client devices 721, 722 to communicate an available DFS channel for the peer-to-peer communication. FIG. 8 shows another exemplary peer-to-peer network. In FIG. 8, a mobile client device 831 may be coupled to a wide area network 834. Independent of any access point, the mobile client device 831 communicates via a DFS channel with a television client device 822 and another mobile client device 833 and forms a peer-to-peer network 890 with a computer client device 821 and a wearable client device 832. As illustrated in FIG. 8, each of the client devices may communicate with one or more of the other client devices in the peer-to-peer network 890. The DFS master device 800 communicates with at least one of the client devices 821, 822, 831, 832, 833 to communicate an available DFS channel for the peer-to-peer communication.

Figure 9:
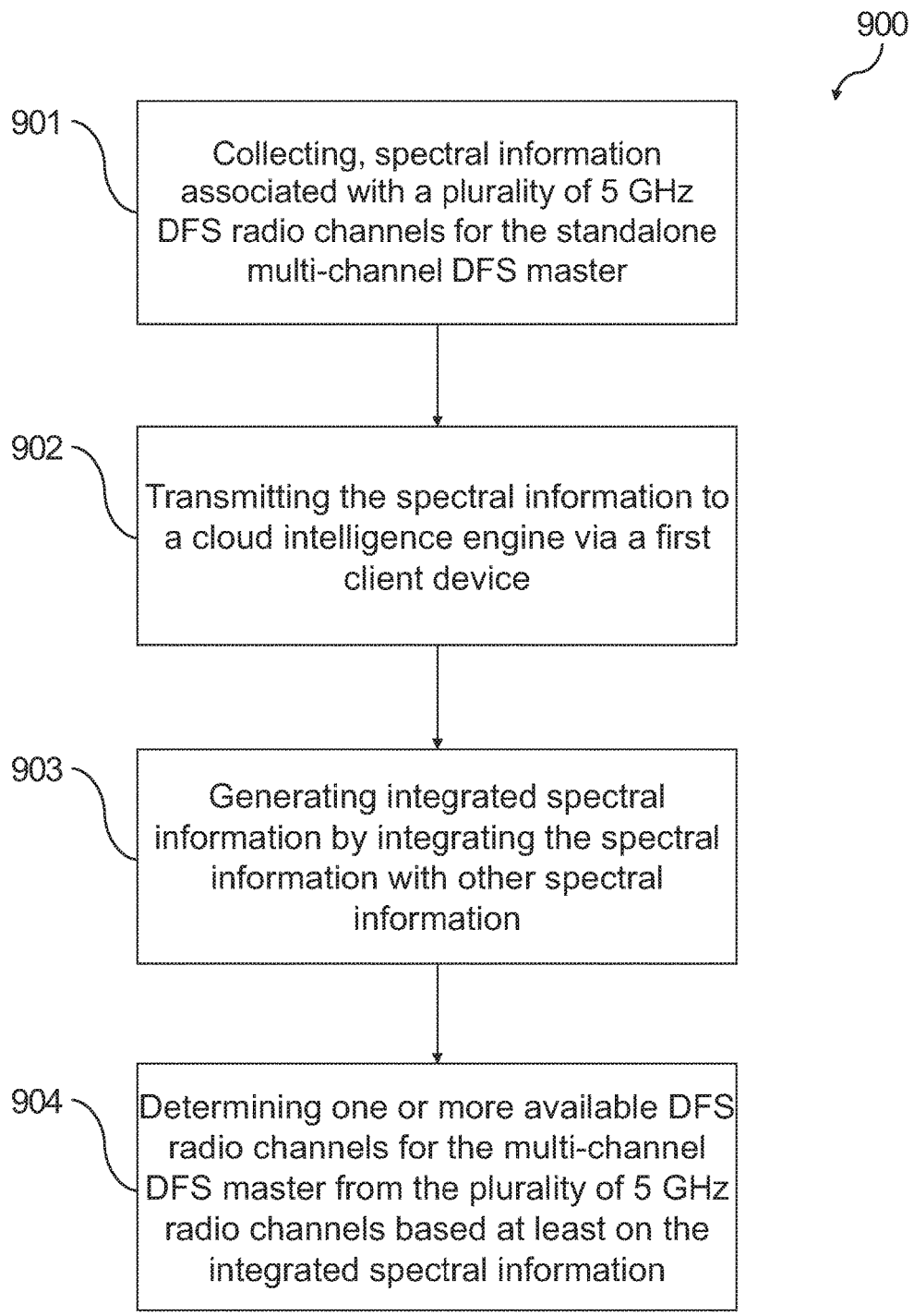
FIG. 9 illustrates an exemplary method according to the present invention for providing DFS spectrum access in peer-to-peer wireless networks.
Figure 10:
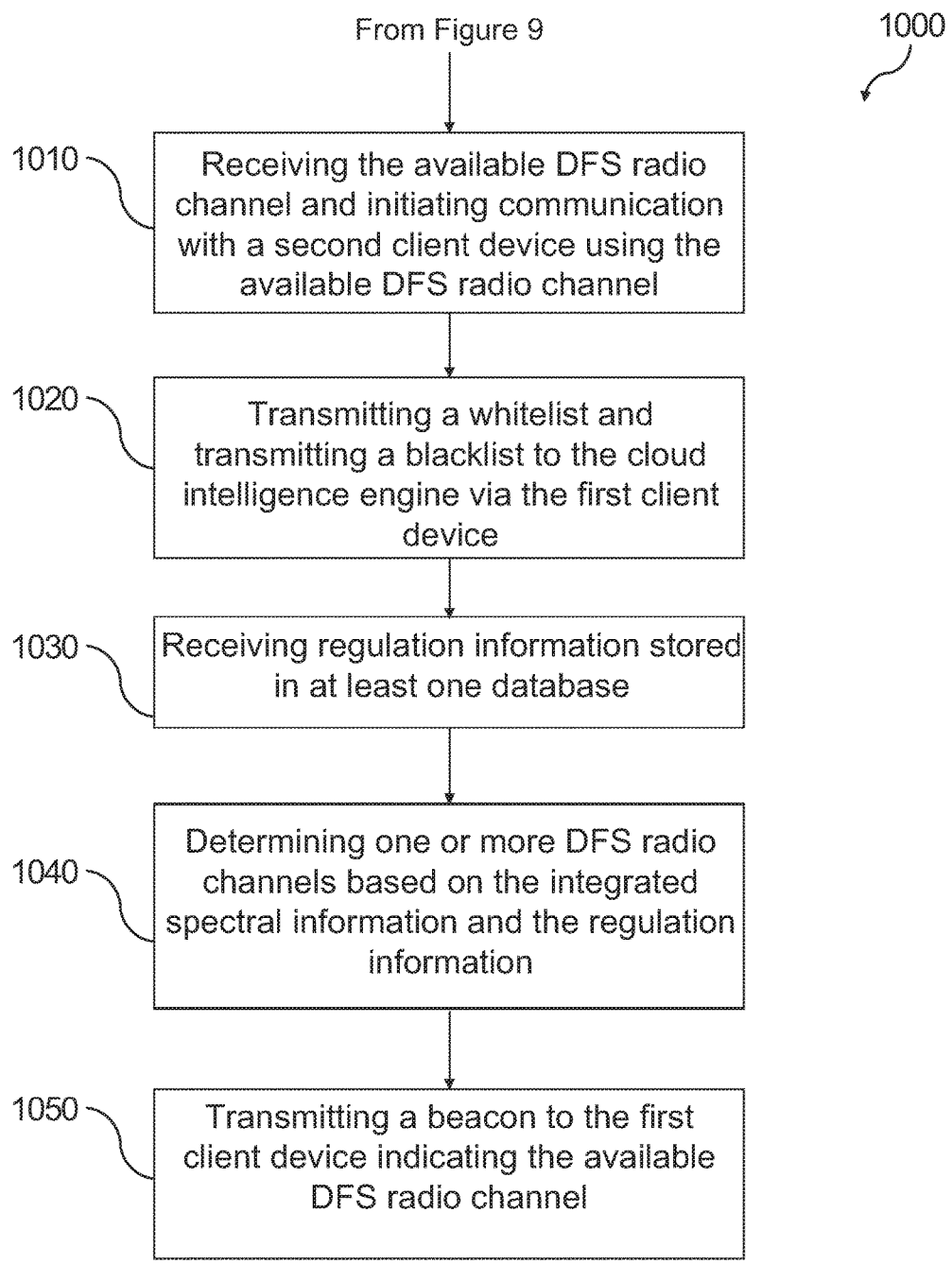
FIG. 10 illustrates additional optional steps in a method according to the present invention for providing DFS spectrum access in peer-to-peer wireless networks.

In view of the subject matter described supra, methods that can be implemented in accordance with the subject disclosure will be better appreciated with reference to the flowcharts of FIGS. 9-10. While for purposes of simplicity of explanation, the methods are shown and described as a series of blocks, it is to be understood and appreciated that such illustrations or corresponding descriptions are not limited by the order of the blocks, as some blocks may occur in different orders and/or concurrently with other blocks from what is depicted and described herein. Any nonsequential, or branched, flow illustrated via a flowchart should be understood to indicate that various other branches, flow paths, and orders of the blocks, can be implemented which achieve the same or a similar result. Moreover, not all illustrated blocks may be required to implement the methods described hereinafter.

FIG. 9 illustrates an exemplary method 900 according to the present invention for providing DFS spectrum access in peer-to-peer wireless networks. First, at 901 the standalone multi-channel DFS master collects and/or generates spectral information associated with a plurality of 5 GHz DFS radio channels for the standalone multi-channel DFS master. The spectral information may include information such as, for example, a whitelist (e.g., a whitelist of each of the plurality of 5 GHz DFS communication channels that does not contain a radar signal), a blacklist (e.g., a blacklist of each of the plurality of 5 GHz DFS communication channels that contains a radar signal), scan information associated with a scan for a radar signal in the plurality of 5 GHz DFS communication channels, state information, location information associated with the DFS master device and/or client devices, time signals, scan lists (e.g., scan lists showing neighboring access points, etc.), congestion information (e.g., number of re-try packets, type of re-try packets, etc.), traffic information and/or other spectral information. Next, at 902 the standalone multi-channel DFS master transmits the spectral information to a cloud intelligence engine via a first client device. The first client device is a network enabled device such as a cellular device that can connect to a wide area network and provide that connection to the standalone multi-channel DFS master. The cloud intelligence engine may also receive spectral information associated with a plurality of 5 GHz DFS communication channels from a plurality of multi-channel DFS masters via one or more network devices. Optionally, receiving the spectral information includes receiving scan information associated with scanning for a radar signal in the plurality of 5 GHz DFS radio channels. Analysis of the plurality of 5 GHz DFS communication channels may include switching a 5 GHz radio transceiver of the DFS master device to a channel of the plurality of 5 GHz DFS communication channels, generating a beacon in the channel of the plurality of 5 GHz DFS communication channels, and scanning for a radar signal in the channel of the plurality of 5 GHz DFS communication channels.

Next, at 903 the method of FIG. 9 includes the cloud intelligence engine generating integrated spectral information by integrating the spectral information with other spectral information. The other spectral information may be generated by at least one other DFS master device. In one example, the spectral information may be integrated with the other spectral information via one or more data fusion processes. Then, at 904 the cloud intelligence engine determines a set of available DFS radio channels for the multi-channel DFS master from the plurality of 5 GHz radio channels based at least on the integrated spectral information. For example, a communication channel may be selected from the plurality of 5 GHz DFS communication channels based at least on the integrated spectral information. In an aspect, regulatory information associated with the plurality of 5 GHz DFS communication channels and/or stored in at least one database may be received by the cloud intelligence engine. Furthermore, the communication channel may be further determined based on the regulatory information. In another aspect, an indication of the communication channel may be provided to the DFS master device and/or the client device(s).

FIG. 10 illustrates an exemplary method 1000 according to the present invention for providing DFS spectrum access in peer-to-peer wireless networks. The method illustrated in FIG. 10 includes the steps described in relation to FIG. 9 above but also includes the following optional additional steps. At 1010, the method includes the first client device receiving the available DFS radio channel and initiating communication with a second client device using the available DFS radio channel. In this step, the first client device initiates a peer-to-peer communication network using the available DFS radio channel. At 1020, the method includes transmitting a whitelist of each of the plurality of 5 GHz DFS radio channels that does not contain a radar signal to the cloud intelligence engine via the first client device and transmitting a blacklist of each of the plurality of 5 GHz DFS radio channels that contains a radar signal to the cloud intelligence engine via the first client device. At 1030, the method includes the cloud intelligence engine receiving regulatory information stored in at least one database. And at 1040, the step of determining the DFS radio channel includes determining which DFS radio channel to use based on the integrated spectral information and the regulatory information. And at 1020, the method includes the standalone multi-channel DFS master transmitting a beacon to the first client device indicating the available DFS radio channel.

In the present specification, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in this specification and annexed drawings should generally be construed to mean "one or more" unless specified otherwise or clear from context to be directed to a singular form.

In addition, the terms "example" and "such as" are utilized herein to mean serving as an instance or illustration. Any embodiment or design described herein as an "example" or referred to in connection with a "such as" clause is not necessarily to be construed as preferred or advantageous over other embodiments or designs. Rather, use of the terms "example" or "such as" is intended to present concepts in a concrete fashion. The terms "first," "second," "third," and so forth, as used in the claims and description, unless otherwise clear by context, is for clarity only and does not necessarily indicate or imply any order in time.

What has been described above includes examples of one or more embodiments of the disclosure. It is, of course, not possible to describe every conceivable combination of components or methodologies for purposes of describing these examples, and it can be recognized that many further combinations and permutations of the present embodiments are possible. Accordingly, the embodiments disclosed and/or claimed herein are intended to embrace all such alterations, modifications and variations that fall within the spirit and scope of the detailed description and the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a first client device;
a standalone multi-channel dynamic frequency selection (DFS) master in communication with the first client device and configured to collect spectral information associated with a plurality of 5 GHz DFS communication channels for the standalone multi-channel DFS master;
a cloud intelligence engine in communication with the first client device and configured to receive the spectral information via the first client device, integrate the spectral information with other spectral information to generate integrated spectral information, and determine a set of one or more communication channels for the standalone multi-channel DFS master from the plurality of 5 GHz DFS communication channels based at least on the integrated spectral information, wherein the first client device is configured to receive the set of communication channels and to initiate communication with a second client device using the set of communication channels,
wherein the cloud intelligence engine is configured to transmit the set of communication channels to the first client device, and to transmit the set of communication channels to the standalone multi-channel DFS master via the first client device, and
wherein receiving the spectral information comprises:
receiving a whitelist of each of the plurality of 5 GHz DFS communication channels that does not contain a radar signal;
receiving a blacklist of each of the plurality of 5 GHz DFS communication channels that contains a radar signal; and
receiving the whitelist and blacklist from client devices and other standalone multi-channel DFS masters in range of the standalone multi-channel DFS master using a beacon.

2. The system of claim 1, wherein the standalone multi-channel DFS master is configured to transmit one or more beacons to the first client device indicating the set of communication channels.

3. The system of claim 1, wherein the first client device is configured to transmit the spectral information to the cloud intelligence engine via a cellular network.

4. The system of claim 1, wherein the first client device is configured to transmit the spectral information to the cloud intelligence engine via a wide area network.

5. The system of claim 1, wherein the standalone multi-channel DFS master is integrated into the first client device.

6. The system of claim 1, wherein the standalone multi-channel DFS master is configured to switch a 5 GHz transceiver of the standalone multi-channel DFS master to a channel of the plurality of 5 GHz DFS communication channels, cause a beacon generator of the standalone multi-channel DFS master to generate a beacon in the channel of the plurality of 5 GHzDFS communication channels, and cause a radar detector of the standalone multi-channel DFS master to scan for a radar signal in the channel of the plurality of 5 GHz DFS communication channels.

7. A method, comprising:
  collecting, using a standalone multi-channel DFS master, spectral information associated with a plurality of 5 GHz DFS radio channels for the standalone multi-channel DFS master;
  transmitting, using the standalone multi-channel DFS master, the spectral information to a cloud intelligence engine via a first client device;
  generating, using the cloud intelligence engine, integrated spectral information by integrating the spectral information with other spectral information; and
  determining, using the cloud intelligence engine, one or more available DFS radio channels for the multi-channel DFS master from the plurality of 5 GHz radio channels based at least on the integrated spectral information,
  wherein the cloud intelligence engine is further configured to transmit the set of communication channels to the standalone multi-channel DFS master via the first client device, and
  wherein transmitting the spectral information comprises:
    transmitting a whitelist of each of the plurality of 5 GHz DFS radio channels that does not contain a radar signal to the cloud intelligence engine via the first client device;
    transmitting a blacklist of each of the plurality of 5 GHz DFS radio channels that contains a radar signal to the cloud intelligence engine via the first client device; and
    transmitting the whitelist and blacklist to the client devices and other standalone multi-channel DFS masters in range of the standalone multi-channel DFS master using a beacon.

8. The method of claim 7 further comprising the first client device receiving the available DFS radio channel and initiating communication with a second client device using the one or more available DFS radio channels.

9. The method of claim 7 further comprising transmitting, with the standalone multi-channel DFS master, one or more beacons to the first client device indicating the one or more available DFS radio channels.

10. The method of claim 7, wherein the collecting the spectral information comprises:
  switching a 5 GHz radio transceiver of the standalone multi-channel DFS master to a channel of the plurality of 5 GHz DFS radio channels;
  generating a beacon in the channel of the plurality of 5 GHz DFS radio channels; and
  scanning for a radar signal in the channel of the plurality of 5 GHz DFS radio channels.

11. The method of claim 7, wherein the transmitting the spectral information comprises transmitting scan information associated with the scanning for the radar signal in the channel of the plurality of 5 GHz DFS radio channels.

12. The method of claim 7, further comprising receiving, by the cloud intelligence engine, regulatory information stored in at least one database.

13. The method of claim 12, wherein the determining the one or more DFS radio channels comprises determining the one or more DFS radio channels based on the integrated spectral information and the regulatory information.

14. A system, comprising:
  a standalone dynamic frequency selection (DFS) device configured to collect spectral information associated with a plurality of 5 GHz DFS radio channels based on an analysis of the plurality of 5 GHz DFS radio channels; and
  a cloud intelligence engine configured to receive the spectral information via a client device, integrate the spectral information with other spectral information to generate integrated spectral information, and determine a DFS radio channel for the standalone DFS device from the plurality of 5 GHz DFS radio channels based at least on the integrated spectral information, wherein the other spectral information is generated by at least one other DFS device configured to analyze the plurality of 5 GHz DFS radio channels,
  wherein the standalone DFS device is configured to transmit, to the cloud intelligence engine, the spectral information comprising scan information associated with the scan for the radar signal in the channel of the plurality of 5 GHz DFS radio channels, and
  wherein receiving the spectral information comprises:
    receiving a whitelist of each of the plurality of 5 GHz DFS communication channels that does not contain a radar signal;
    receiving a blacklist of each of the plurality of 5 GHz DFS communication channels that contains a radar signal; and
  receiving the whitelist and blacklist from client devices and other standalone multi-channel DFS masters in range of the standalone multi-channel DFS master using a beacon.

15. The system of claim 14, wherein the standalone DFS device is configured to switch a 5 GHz transceiver of the standalone DFS device to a channel of the plurality of 5 GHz DFS radio channels, generate a beacon in the channel of the plurality of 5 GHz DFS radio channels, and scan for a radar signal in the channel of the plurality of 5 GHz DFS radio channels.

* * * * *